United States Patent [19]
Kobayashi et al.

[11] 3,834,234
[45] Sept. 10, 1974

[54] LEVEL GAUGE OF LIQUID METAL

[75] Inventors: Kazuo Kobayashi, Hitachi; Shoichi Ogaware, Ibaraki, both of Japan

[73] Assignee: Sukegawa Electric Co., Ltd., Hitachi-city, Japan

[22] Filed: Sept. 21, 1972

[21] Appl. No.: 291,080

[30] Foreign Application Priority Data
Sept. 30, 1971  Japan.............................. 46-76744

[52] U.S. Cl. .............................. 73/290 R, 336/136
[51] Int. Cl. .............................................. G01f 23/00
[58] Field of Search .......... 73/290 R, 304 R, 362 R; 336/136

[56] References Cited
UNITED STATES PATENTS

| | | | |
|---|---|---|---|
| 2,776,563 | 1/1957 | Holbert | 73/290 R |
| 3,031,633 | 4/1962 | Chass | 336/136 |
| 3,058,345 | 10/1962 | Mastros | 73/30 X |
| 3,089,081 | 5/1963 | Brash | 336/136 X |
| 3,157,048 | 11/1964 | Williams | 73/304 R |
| 3,402,607 | 9/1968 | Cambillard et al. | 73/304 R |
| 3,678,748 | 7/1972 | Dziedzic | 73/290 R |

Primary Examiner—Richard C. Queisser
Assistant Examiner—Daniel M. Yasich
Attorney, Agent, or Firm—George B. Oujevolk

[57] ABSTRACT

A level gauge of liquid metal which has a detecting element formed with a primary coil and a secondary coil, a compensating element formed with a primary coil and a secondary coil, both elements being inserted in a container of liquid metal, said compensating element covered with metal so as to have a magnetic permeability equal to that of the liquid metal. The output of an oscillator is supplied to the primary coils of the detecting element and compensating element to detect the difference of the induced output at the secondary coils of the respective elements. Thus, reliable measurement may be obtained thereby.

3 Claims, 3 Drawing Figures

PATENTED SEP 10 1974

LEVEL GAUGE OF LIQUID METAL

This invention relates to a level gauge of liquid metal, and more particularly to the measurement of liquid level of liquid metal sodium used in atomic energy work.

Heretofore, it was the practice to measure the liquid level by the induced output of the secondary coil, utilizing the fact that the detecting element formed with a primary and secondary coils is inserted in a container of liquid metal, and an electric degree of coupling of the primary and secondary coils depends upon the level change of the metal.

However, if the temperature of liquid metal varies, not only the magnetic permeability of the metal itself varies, but the magnetic permeability of the member forming the detecting element also changes, and further the resistances of the primary and secondary coils change depending upon the temperature change. Also the temperature varies according to the temperature gradient due to the increase or decrease of the level, and accordingly attempts have been made to compensate for the errors due to temperature, but there is as yet no single way of doing this, so that it is difficult to accurately detect liquid level.

This invention contemplates eliminating the aforementioned disadvantages of the conventional liquid level gauge, and to provide a novel and improved level gauge of liquid metal.

One characteristic feature of the present invention resides in a level gauge of liquid metal which comprises a detecting element formed with a primary and secondary coils, a temperature compensating element formed with a primary coil and a secondary coil, both elements being inserted in a container of liquid metal, said compensating element being covered with metal so as to have a magnetic permeability equal to that of liquid metal. The output of an oscillator is supplied to the primary coils of the detecting element and compensating element to detect the difference of the induced output at the secondary coils of the respective elements.

Other features and advantages of the present invention will becomes apparent from the following description taken in conjunction with the accompanying drawings, in which.

Figure 1:
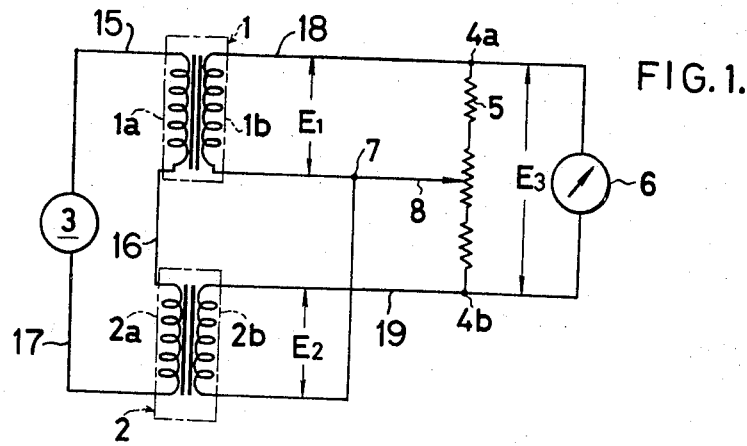
FIG. 1 is an electric circuit diagram of one embodiment of the level gauge of the present invention.

Reference is now made to the drawings, and particularly to FIG. 1, which shows one embodiment of level gauge of the present invention.

The primary coil $1a$ of a detecting element 1 and the primary coil $2a$ of a temperature compensating element 2 are connected in series, and an oscillator 3 is connected thereto, and the secondary coils $1b$ and $2b$ of both the elements are connected in series so as to have opposite polarity, and then a resistor 5 and an indicator 6 are connected between the terminals $4a$ and $4b$ of the secondary coils in parallel. The connecting point 7 of the secondary coils $1b$ and $2b$ and the resistor 5 are connected by a slidable adjuster 8.

Figure 2:
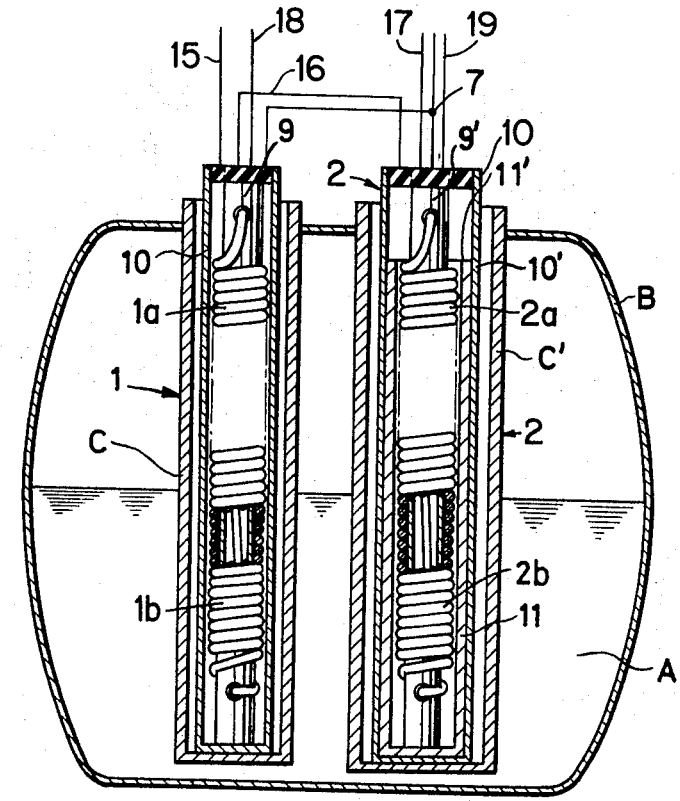
FIG. 2 is a longitudinal sectional view of an essential part used in the level gauge; and, FIG. 3 is a graph showing the relationship between the liquid level and induced voltage of the measured result.

As shown in FIG. 2, the detecting element 1 and compensating element 2 are used by inserting them into guide tubes C and C' of stainless steel, etc. vertically fixed to a container B of liquid metal A, and the primary coils $1a$ and $2a$ and secondary coils $1b$ and $2b$ are wound on metal cores 9 and 9', and they are contained in protecting tubes 10 and 10' with bottoms of stainless steel. Metal tube 11 with bottom of aluminium, etc. is inserted between the primary and secondary coils $2a$ and $2b$ of the compensating element 2 and the protecting tubes 10'. The metal tube 11 must be made by the metal having equivalent magnetic permeability to that of liquid metal A, and is of such length as to completely shield the coils.

Thus, lead line 15 connects coil $1a$ to the oscillator 3, lead line 16 connects coil $1a$ and $2a$, lead line 17 connects coil $2a$ to oscillator 3. Lead lines 18 connects coil $1b$ to the indicator, lead line 19 connects coil $2b$ to the oscillator.

Figure 3:
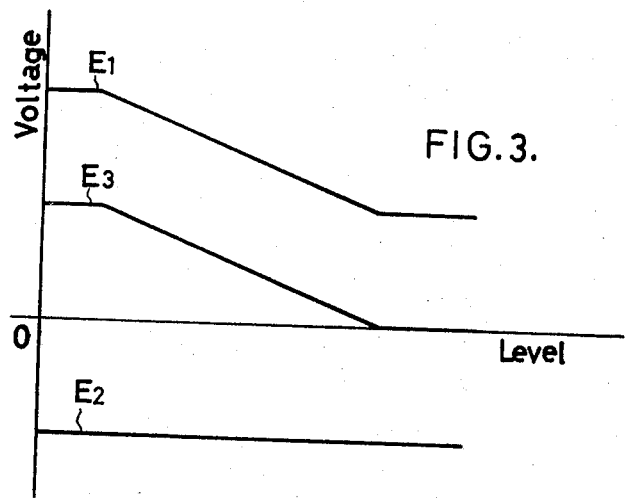

When the level of the liquid metal A is varied, a voltage as shown by $E_1$ in FIG. 3 is induced in the secondary coil $1b$ of the detecting coil 1, and negative voltage as shown by $E_2$ is induced in the secondary coil $2b$ of the temperature compensating element 2, and accordingly $E_3$ is indicated by the indicator 6 as the difference of the voltages $E_1$ and $E_2$.

The voltage $E_1$ not only indicates the level of the liquid metal, but varies affected by the temperature change of the metal, however since the voltage $E_2$ is the same temperature condition as the detecting element 1, and yet the metal is contained in the metal tube 11 of the equivalent material with the same the magnetic permeability as that of the detecting element 1, the level is always under the same conditions as that at the head 11' of the metal tube 11, and accordingly even if the level is varied, $E_2$ does not change at all thereby. For this reason, if the difference of the voltages $E_1$ and $E_2$ is detected, any error caused by the temperature change is removed and a correct output is obtained from the voltage $E_1$ by the detecting element, and since the detecting element 1 and the compensating element 2 are under entirely the same conditions, the variations of the voltage $E_2$ by the temperature change of the compensating element 2 becomes equal to the change of the temperature distribution by the change of the level in the voltage $E_1$, and accordingly the level may be accurately known.

It should be understood from the foregoing description that since in the present invention the detecting element 1 and the compensating element 2 inserted into the container B of liquid metal A are formed with primary and secondary coils $1a$ and $2a$, and $1b$ and $2b$, and the compensating element 2 is covered by the metal having a magnetic permeability equal to that of the liquid metal A, and the output of the oscillator 3 is supplied to the primary coils $1a$ and $2a$ of the detecting and compensating elements 1 and 2 so as to detect the difference of the induced output in the secondary coils $1b$ and $2b$ of the respective elements, the change of the level of the liquid metal by the temperature may be accurately removed from the detected results of the detecting element 1 so as to make possible a reliable measurement.

Having now fully described the invention, it will be apparent to one of ordinary skill in the art, that many changes and modifications can be made thereto, with-

What is claimed is:

1. In a level gauge of liquid metal having a pair of elongated cores, a detecting element having a primary coil and a secondary coil on one core, a temperature compensating element having a primary coil and a secondary coil on the second core, both elements being inserted in a container of liquid metal so that the degree of electrical coupling between primary and secondary coils depends on the level of the metal, said compensating element being covered with a metal shield having a magnetic permeability equal to that of the liquid metal, and an oscillator for supplying voltage signal to both the primary coil of said detecting element and to the compensating element, and indicator means coupled to said elements to detect the difference in the induced output of the respective elements, as liquid level, the improvement therein wherein the primary coil of said detecting element and the primary coil of said compensating element are connected in series, and oscillator is connected thereto, the secondary coils of both said elements are connected in series in opposite polarity, and a resistor and said indicator means are connected between the terminals of said resistor in parallel, the connecting point of the secondary coils and said resistor being connected by a slidable adjuster.

2. A level gauge as set forth in claim 1, further comprising outer guide tubes of stainless steel, said detecting element and said compensating element being vertically disposed therein for insertion into said container of liquid metal, protecting tubes with bottoms of stainless steel within said guide tubes for containing said primary and secondary coils, said metal shield being a metal tube with bottom, of aluminium, disposed between the primary and secondary coils of said compensating element and the protecting tubes.

3. A level gauge as set forth in claim 2, wherein the metal shield tube is made of a metal having a magnetic permeability equal to that of liquid metal, and completly covers the coils.

* * * * *